US008732579B2

(12) United States Patent
Rossmann et al.

(10) Patent No.: US 8,732,579 B2
(45) Date of Patent: May 20, 2014

(54) RAPID PREVIEW OF REMOTE VIDEO CONTENT

(75) Inventors: Alain Rossmann, Palo Alto, CA (US); Adrian Detremescu, Palo Alto, CA (US); Eric Liu, Palo Alto, CA (US); Arie Grapa, Palo Alto, CA (US)

(73) Assignee: KLIP, Inc., Palo Alto, CA (US)

( * ) Notice: Subject to any disclaimer, the term of this patent is extended or adjusted under 35 U.S.C. 154(b) by 10 days.

(21) Appl. No.: 13/243,845

(22) Filed: Sep. 23, 2011

(65) Prior Publication Data
US 2013/0080895 A1 Mar. 28, 2013

(51) Int. Cl.
*G06F 3/00* (2006.01)

(52) U.S. Cl.
USPC .......................................................... 715/712

(58) Field of Classification Search
USPC ........................... 715/234, 243, 254, 255, 712
See application file for complete search history.

(56) References Cited

U.S. PATENT DOCUMENTS

| 7,797,633 | B2 * | 9/2010 | Flick et al. ..................... 715/726 |
| 2005/0231643 | A1 * | 10/2005 | Ross et al. ..................... 348/578 |
| 2006/0067530 | A1 * | 3/2006 | Noguchi et al. ............... 380/203 |
| 2007/0083883 | A1 * | 4/2007 | Deng ............................. 725/19 |
| 2008/0084400 | A1 * | 4/2008 | Rosenberg ..................... 345/173 |
| 2008/0212039 | A1 * | 9/2008 | Taylor ............................. 353/79 |
| 2009/0013351 | A1 * | 1/2009 | Liao et al. ...................... 725/39 |
| 2009/0237236 | A1 * | 9/2009 | Maassarani ............... 340/539.13 |
| 2011/0197131 | A1 * | 8/2011 | Duffin et al. ................... 715/720 |
| 2012/0011442 | A1 * | 1/2012 | Fay et al. ....................... 715/723 |
| 2012/0081375 | A1 * | 4/2012 | Robert et al. .................. 345/522 |
| 2012/0330758 | A1 * | 12/2012 | Kaushik et al. ............ 705/14.73 |

* cited by examiner

*Primary Examiner* — Kyle Stork
(74) *Attorney, Agent, or Firm* — Stephen E. Zweig

(57) ABSTRACT

An internet client-server method to rapidly preview video files. Source video files are compressed into lower resolution preview video files, thumbnail image files, and stored on a preview internet server. Typically only a small fraction of the source video frames, such as 1 frame in 60, is used for the preview. A user using a touch sensitive computerized device such as a smartphone can view the thumbnail video images while the compressed video files load in the background. When the user touches or swipes an image of interest, or shakes the device, device video preview application software detects the action and directs the device to start playing the preview video file(s). The application software detects when the user swipes the preview video, and changes the rate and direction of playback of the preview video file, and trickplay functionality, often according to the speed and/or direction of the swipe.

19 Claims, 5 Drawing Sheets

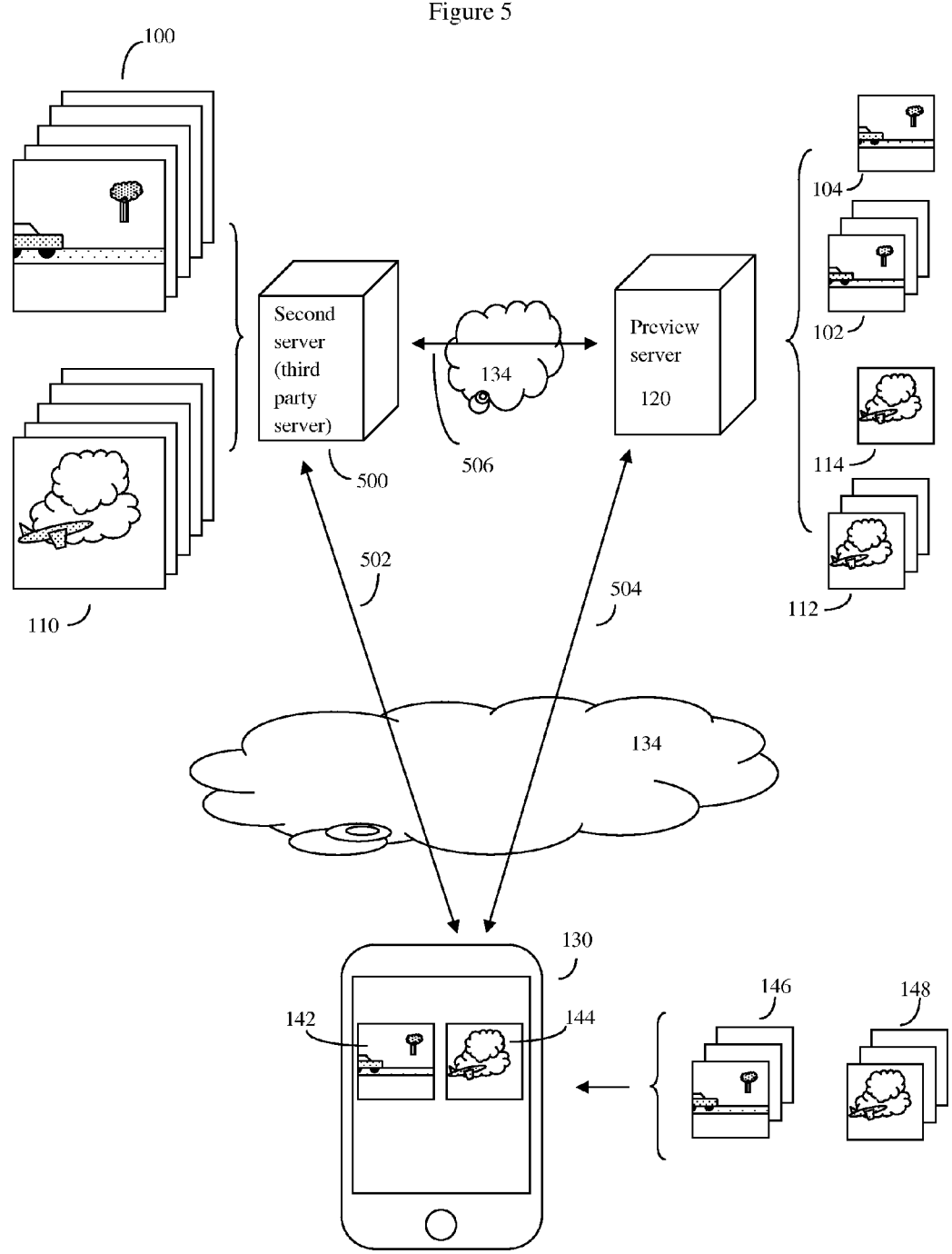

RAPID PREVIEW OF REMOTE VIDEO CONTENT

BACKGROUND OF THE INVENTION

1. Field of the Invention

This invention is in the field of computer networking and computerized video technology.

2. Description of the Related Art

One of the drawbacks of video, and particularly web based video that is often stored in remote internet servers, and delivered to clients in the form of various web pages, is that the remote video content cannot be easily scanned by users the way text or photos can.

For example, consider the popular internet video site "YouTube.com", presently run by Google Corporation. Here, users using an internet connected client computerized device, usually using a web browser, can contact the YouTube.com server(s), enter in video search parameters into a search box, and be presented with a web page containing a list of 10 to 50 different video titles, along with thumbnail video images (usually taken from the first frame of the associated video file), and brief written descriptions of the various titles. However in order to find out more about the contents of a particular video file, the user must then click on a particular thumbnail video image, and either watch the video at real time speed, or else wait for more of the source video to be downloaded from the YouTube server, and be stored in memory of the client computerized device. Once enough of the source video of potential interest has been downloaded, the user can then attempt to move a progress marker though the video, and stop and examine portions of the source video of interest. This method is both slow and cumbersome.

In an alternative approach, the "Bing.com" video search service, presently run by Microsoft Corporation. Bing video can also present a user with a list of still thumbnail video images, along with the title of the video and the running time and upload date of the video. Clicking on any of these videos results in the thumbnail playing a series of 3-5 short (several second long) excerpts from the video, here presented with sound, and in real-time speed. These short real-time speed excerpts thus do not give the user a representative view of the full contents of the video, nor do they give the user any degree of control over what portions of the preview video to look at.

Given the advances in storage technology, high bandwidth internet connections, and low cost video production technology, the number of available internet videos is increasing almost exponentially every year. Thus improved methods to enable users to more efficiently screen and select internet videos of interest are of significant commercial value.

BRIEF SUMMARY OF THE INVENTION

The invention is based, in part, on the insight that at present there is an unmet need for users to be able to both rapidly and accurately preview large numbers of remote video files of potential interest.

The invention is also based, in part, on the insight that in order to accurately preview a remote video file of interest, a user should ideally be presented with a representative view of the entire video, rather than a single still thumbnail image, or a few short pre-selected "high points". The user should ideally also have precise control over the rate at which the preview video is viewed. Indeed ideally a user should be able to rapidly go forwards or backwards through a preview video at will, pause, and be able to instantly jump in to the original higher quality source video at essentially any given point of interest at will (sometimes called "trickplay" functionality).

The invention is further based, in part, on the insight that in order to accomplish these objectives, what is needed is both a novel type of preview internet server, running preview internet server software, that can store a new type of compressed preview video files. The compressed preview video file will be obtained from the (usually higher quality) source video files, and although usually both time (e.g. only 1 frame in 60 from the original source video file may be used for the compressed preview file) and in image resolution, will nonetheless give the user a fairly accurate visual summary of the original source video.

The invention also makes use of a novel type of video preview application software, running on a client computerized device, to retrieve these compressed video files, and allow the user the desired degree of viewing control over the preview video files. The video preview application software may additionally allow the user to retrieve selected (and usually higher quality) source video files, or portions of source video files, for local user viewing as desired.

Although the invention will frequently be described herein in terms of methods terminology, the invention may alternatively be viewed as program media (e.g. stored software programs) that in turn may instruct various computer processors on the respective preview internet servers and client computerized devices to perform the methods and functionality discussed in this disclosure.

The invention may in principle be employed on a wide variety of computerized devices, including standard desktop computers and laptop computers that are not equipped with touch screens, but rather are equipped with mice, track pads, or other non-touch screen position sensors. However in a preferred embodiment, the client computerized device will be a touch screen equipped computerized device, exemplified by high performance smart phones, tablet computers, and the like. However when run on non-preferred non-touch screen computerized devices, the touch sensitive functions of touching, selection, and swiping may be accomplished by other position sensors such as mice.

Often these devices will be connected to the internet by one or more wireless links, such as WiFi and Cellular telephone links.

Thus in at least one embodiment, the invention may be viewed as an internet client-server method of allowing a user to rapidly preview a plurality of video files. This method may comprise obtaining a plurality of source video files, creating a plurality of compressed preview video files and thumbnail video image files from these source video files, and storing the plurality of source video files, compressed preview video files, and thumbnail video image files on a preview internet server. According to the method, a user may rapidly view these compressed preview video files using a client computerized device. As previously discussed, this device may be a Smartphone or tablet computer with at least one processor, memory, a touch sensitive display screen, internet connectivity and video preview application software (application software). The invention enables the user will use his or her client computerized device to request at least some of the various thumbnail video image files from the preview internet server, and these images on the display screen on the user's device. The preview internet server(s) will (often automatically) transmit at least some of the associated compressed preview video files to the user's device, where they will be stored in memory.

As a result, when the user touches a thumbnail image of interest, or does some alternative signaling act like shaking his or her device, or giving a voice command, or other command, the device's video preview application software detects this command (e.g. touch) and directs the device's processor to start playing the one or more compressed preview video files. The application software also detects when the user swipes (e.g. a moving touch) the preview video image and changes the rate of playback of the preview video file, often according to the speed and/or direction of the swipe.

BRIEF DESCRIPTION OF THE DRAWINGS

FIG. 5 shows an embodiment in which the source video files may be stored on a second server (e.g. a third party server), and based on requests from the client computerized device, these source files may be sent to the preview server, compressed, and then transmitted to the client computerized device for rapid preview.

DETAILED DESCRIPTION OF THE INVENTION

Figure 1:
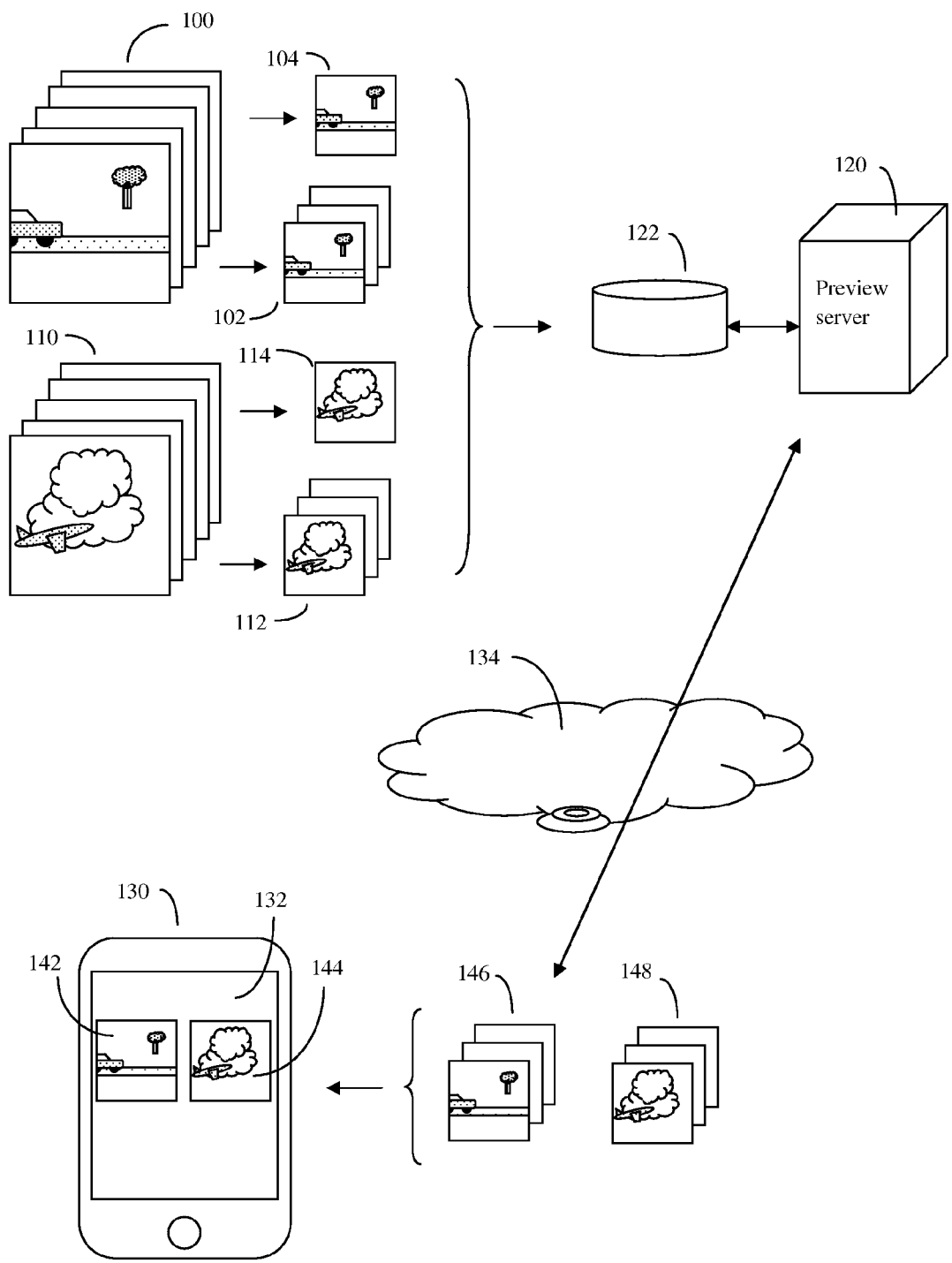
FIG. 1 shows an overview of the process of creating compressed preview video files and optional thumbnail video image files from source video files, storing them on a preview internet server, and downloading these files to a client computerized device, such as a smartphone.

Drawing conventions: This invention is concerned with video playback methods, and to show video playback on black and white line art drawings, certain standard drawing conventions and abstractions must be used. Here, whenever the drawing shows a series of related images side by side to one another, with only small differences between the related images, these images should be understood to represent the various stages of the video playback of that particular file as a function of time. Thus earlier moments in time will be represented by images to the left, and later moments of time are represented by images on the right. The overall artistic convention is thus not unlike showing a series of frames from a motion picture film.

The invention: As previously discussed, in one embodiment, the invention may be an internet based client-server method of allowing a user to rapidly preview a plurality of video files. Generally, this method will comprise first obtaining a plurality of source video files. These source video files may be in a variety of different digital video formats, and may themselves either be either compressed or non-compressed video. Examples of typical formats for the source video files include AVI, MPEG2, FLV, F4V, MPEG4, and the like. Often the video files will have associated sound as well, but this is not strictly required.

These source video files will often be of a resolution and frame rate compatible with comfortable viewing on standard devices, but the resulting file size may often be too large to enable a plurality of such files to be transported over standard broadband networks, in particular wireless networks, at the very high speeds (e.g. a fraction of a second) preferred by most viewers. In order to enable a plurality of such source video files to be rapidly transmitted, in a format designed for rapid previewing, often these source video files will be further compressed to form compressed preview video files.

Although a variety of different compression methods may be used, in a preferred embodiment, the compression method will not attempt to compress every image (frame) of the original source video file, but will rather skip frames, and for example only use 1 frame for every 10, 20, 30, 40, 50, 60, 100, 200, and so on frames of the original. This frame skipping is done because the user will be scrolling rapidly back and forth in the compressed preview video files, and at the anticipated rapid play rates, the intermediary frames are both unnecessary and also contribute to the compressed video file size, which is undesirable.

Often the source video file will be encoded in a lossy format, where, for example, intraframe (I-frame) images are encoded as full compressed images, capable of being shown directly in a stand-alone manner, and these I-frames are separated by predictive frames (P-frames) or bidirectionally predictive (B-frames) that encode for image differences, and which cannot be viewed in a standalone manner without information from the I-frame and preceding or succeeding P-frames or B-frames. In some embodiments of the invention, when such source video files are used, it will be useful to use the I-frames (and often every "n" I-frames) as a basis for forming the compressed preview video files. However this is not strictly necessary, and frames computed from predictive frames or bidirectionally predictive frames or other method may also be used.

In a preferred embodiment, the compressed preview video will itself have enough "frame skipping" so that, for example, if played at the same frames per second as the source video file, a one minute segment of a source video file will take six seconds or less in the compressed preview video file form. Of course in reality, the actual rate of speed of play of the compressed video file on the user computerized device will often be controlled by the user, so the actual playback time will differ.

In addition to time compression by skipping frames, the compressed preview video files will also often reduce file size further by compressing the size or resolution of the video frames/images as well. This can be done by various means including simply reducing the resolution (e.g. number of pixels per image), reducing the color depth of the image, and by employing more aggressive lossy image compression schemes. The net result will often be to produce compressed preview video files that, in terms of image quality, are often equivalent to less than half the resolution of the source video file. Often the image quality of the compressed preview video file will be of "thumbnail image" quality, in the sense that the image on the average display screen may appear to be of decent quality when scaled to about the size of the user's thumb.

Because at the anticipated preview speeds, sampling the sound form the original source video will generally produce unsatisfactory results, in some embodiments, the compressed preview videos may not have associated sound tracks. This is often desirable to further reduce the file size, and hence the transmission time, of the compressed preview video files. However in other embodiments, any type of sound information may in principle be associated with the compressed preview video files.

Although, as previously discussed, often a substantial amount of frame skipping will be used in order to time compress the source video files into the compressed preview video files, the resulting images when played back may thus appear to be discontinuous or "jerky". To make the compressed preview video files more visually acceptable, in some embodiments, various types of image smoothing or intermediate frames may be placed in between the various sampled source video frames. To reduce the file size of the compressed video files, often such image smoothing or intermediate frames (e.g. a morphing or dissolve function) may be produced by the user's computerized device the time of playback. Alternatively such image smoothing or intermediate frames can be produced during the original process of making the compressed preview video files, in which case at least some image smoothing or intermediate frames may be included in the compressed preview video files as well.

In order to produce a web page or other user video viewing program that can load as close to instantaneously as possible, in some embodiments, it will additionally be useful to produce thumbnail video image files as well, often during the process of making the compressed preview video files. These thumbnail video image files will often be chosen to be of the same size and resolution and appearance as the first video image of the associated compressed preview video file. Thus, for example, when a client (e.g. user) computerized device contacts a server (here called the preview internet server) holding the compressed preview video files and requests a web page containing, for example 10 different compressed preview video files, the preview internet server will initially send a web page with 10 different thumbnail video image files. Each thumbnail video image file will represent its respective compressed preview video file, and in turn may also represent the original source video files as well. The user will thus nearly instantaneously see a web page with, for example, 10 images representing the various video files. While the user looks at the web page, the corresponding compressed preview video files can continue to load in the background, and thus be nearly instantaneously available for video previewing as desired. These thumbnail video image files may be produced from the original source video files, but often may conveniently be produced from the first frame of the compressed video preview file.

Alternatively, in embodiments where the network speed is so fast that even a reasonably large number, such as 10-50 compressed preview video files can also be downloaded in a fraction of a second, the step of preparing thumbnail video image files may be skipped, and instead still image frames directly derived from the compressed preview video files may be generated in real time by the preview server or client computerized device and used instead.

The client computerized device used to view the video files will generally consist of a computerized device with at least one processor (often an x96, ARM, MIPS or other type single or multiple core processor) memory (e.g. RAM, Flash, ROM or other type computer memory), preferably a touch sensitive display screen, a network connection (which may often have at least some parts of the connection proceeding over a wireless connection, such as a WiFi or cellular wireless connection) to the preview internet server; operating system software (e.g. Windows, Linux, Android, iOS, or other type operating system software) and video preview application software (here often abbreviated as simply "application software"). Examples of such devices can include smartphones such as the popular Apple iPhone or Android smartphones, tablet devices such as the popular Apple iPad, and other computerized devices.

FIG. 1 shows an overview of the process of creating compressed preview video files and optional thumbnail video image files from source video files, storing them on a preview internet server, and downloading these files to a client computerized device, such as a smartphone.

Here two different source video files (100) and (110) (here shown as a series of frames of video images) are compressed as previously described. Source video file (100) shows a car driving along a road, while source video file (110) shows an airplane flying through clouds. The compression procedure produces corresponding compressed preview video files (102, 112) (here shown as a smaller number of frames of smaller video images) and optional thumbnail video image files (104, 114) (here shown as single image files). As previously discussed, the source video files (100), (110) may be converted into preview video files and thumbnail files by either one or more processors running the preview internet server (120) itself, or by other processors on other devices (not shown). These files will usually be stored on a database (122) connected to or under the control of preview internet server (120). The operations of the preview internet server will normally be controlled by preview software residing in the memory of said preview internet server, and controlling the operation of one preview internet server computer processors.

The client computerized device (130), which will usually have a touch sensitive display screen (132), and may (usually with the aid of its own application software and usually in response to user commands) request a copy of at least some of the plurality of thumbnail video image files (e.g. 104, 114) from the preview internet server (120). The device (130) will often display images (142, 144) produced from these thumbnail video image files (104, 114) or preview video files (102, 112) on its touch sensitive display screen (132), often within a web browser or other type application program (app), such as a video preview application program. Client computerized device (130) will have a network connection via the internet to Preview server (120), and in some embodiments, this may be via a wireless link such as a WiFi or Cellular telephone link. In some embodiments, client computerized device (130) may be a smartphone or touch pad device such as the popular Apple iPhone, iPad, or Android series of devices.

Depending on how the invention's server and client side software is configured, the client computerized device (130) may immediately and automatically also request a copy of at least some of the plurality of compressed preview video files (102, 104) from the preview server (120) over a network such as the internet (134) at the time that it displays the various thumbnail images. These copies of the compressed preview video files (146, 148) will usually be stored in the memory (202) of the client computerized device (130). Alternatively other compressed preview video file downloading schemes, such as only downloading compressed video files (102, 112) when the user touches the corresponding thumbnail image (142, 144) may be used. Still other schemes may delay initially download of the compressed preview video files while the system determines if the user is interested in the various thumbnail images, and if the user touches one thumbnail video image, the system may then speculatively also download other nearby (in terms of proximity of thumbnail images) compressed preview video files as well.

As yet another alternative, application software running on the client computerized device (130), or software running on preview internet server (120) may allow the user to select an algorithm or policy for downloading compressed preview video files to his or client computerized device. Similarly, the application software or software running on the preview internet server (120) may monitor the user's history pattern of viewing compressed preview video files (102, 112) and source video files (100, 110) and automatically select an algorithm or policy for downloading compressed preview video files (102, 112) according to the user viewing history or pattern.

Note that there is no requirement that the compressed preview video file(s) (102, 112, 146, and 148) be fully downloaded before they commence playing on the client computerized device (130). In some embodiments, the compressed preview video files can begin playing as soon as at least some image frames from the file(s) are received.

According to the invention, upon a triggering event, such as when the user touches the thumbnail image(s) (142, 144) displayed on the touch sensitive display screen (132), application software running onboard computerized device (130) detects this touch or triggering event (210) and directs the computerized devices' processor to commence playing one or more of the preview video file(s) (146, 148) on display screen (132). Further, the application software will usually be configured so that upon detecting a playback control event, such as when the user swipes one or more of the thumbnail images (142, 144) displayed on the touch sensitive display screen (132), said the application software will detect this swiping and change the rate of playing of the preview video file on the display screen according to the speed and/or direction of the swipe.

Figure 2:
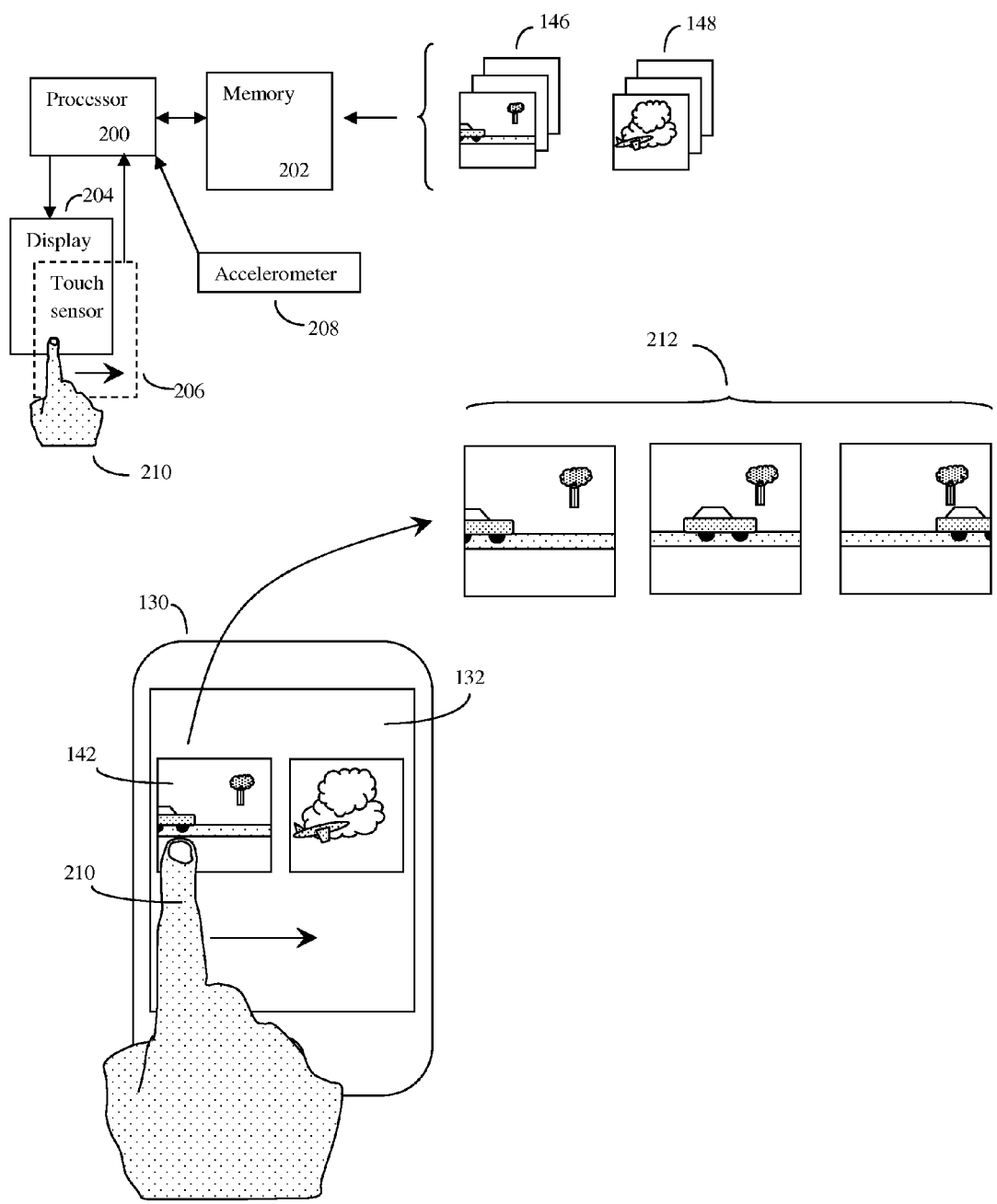
FIG. 2 shows how finger movements on a touch sensitive display screen can be used to rapidly move forward, backward, or pause at a specific location on a compressed preview video.

FIG. 2 shows more detail of how user finger movements on a touch sensitive display screen can be used to rapidly move forward, backward, or pause at a specific location on a compressed preview video.

Here, some of the inner electrical components of the computerized device (130) are shown in more detail (200-208). As previously discussed, computerized device (130) will generally comprise at least one processor (200) (e.g. microprocessor, often in the x86, AIM, MIPS, or other single core or multiple core processor family), and memory (202) (e.g. FLASH memory, RAM, ROM, often with a capacity of hundreds of megabytes, gigabytes, or more). The touch sensitive display screen of the computerized device (132) will itself generally comprise a video display component (204) (e.g. a bit mapped display capable of showing video) and a touch sensor or touch pad component (206) usually positioned directly on top of the display, or as an integral part of the display. The touch sensor (often multi-touch capable) will detect the position of the various points of contact (touching) with the touch sensor surface, and communicate this touch position data to processor (200). The computerized device (130) will often have other components such as an accelerometer (208), and network interface devices, such as wireless WiFi, Cellular transceivers, infrared or wired network ports, and so on (not shown).

As previously discussed, in FIG. 2, the compressed preview video files (146), (148) have been downloaded from the preview internet server (120) and are now stored in the memory (202) of computerized device (130). Here a user is shown swiping (a moving touch) the portion of the touch sensitive display screen (132) above a thumbnail image (142) of a video of interest, for example by using a finger (210). The touch sensor (206) reads the coordinates of the touch and transmits these coordinates to processor (200). Processor (200), as instructed by application software residing in memory (202) in this example determines that the touch coordinates correspond to preview video (146). In this example, the application software further determines that the direction and speed of the touch corresponds to a command for a rapid fast-forward viewing of compressed preview video file (146).

To implement this commend, the processor (200) in turn transmits the video contained in compressed preview video file (146) to the display screen (204, 130). The net result is that the user can review the contents of the original source video file (100) very rapidly as a short video (212), with although it may have a duration on the order of seconds, nonetheless contains a uniform sampling of the contents of the original source video.

Thus in the example shown in FIG. 2, while the original source video (100) may have been of a long duration car ride of 10 minutes or more, the compressed preview video file will play back at the speed of the user's finger swipe. For example, at some settings, the entire compressed preview video file (146) will play back in the time it takes the user's finger (210) to travel from the left side of thumbnail image (142) to the right side of thumbnail image (142), which might be a second, fraction of a second, or several seconds. The exact sensitivity of the user finger control can be adjusted or set by the application software.

As the speed of the finger swipe (210) increases, as needed, the application software may skip frames on the playback of compressed preview video file (146) to speed up the playback, or alternatively may add additional frames by dissolving or morphing between successive frames to slow down the playback. The application software may also be configured to detect when the user's finger reverses direction, and in turn reverse the playback of the compressed preview video file (146) accordingly. The application software may also be configured to detect when the user's finger pauses for a significant amount of time during the scroll, and/or detect other video control signals such as increased spreading or pressure, thus indicating to the application software that the user is particularly interested in viewing a certain portion of the video being shown during the finger pause and increased pressure (or other control signal).

The application software may be configured to detect other types of touch commands as well. Examples of other types of touch commands include multi-touch commands, where a user may, for example, pause swiping with a first finger, thus freezing the playback at a particular location in the video, and then use a second finger to expand or contract the size of the video, or to indicate that the user now wants to shift to viewing the usually higher quality source video (100).

In some embodiments, the computerized device (130) may be sensitive to voice commands to assist this playback process as well.

Figure 3:
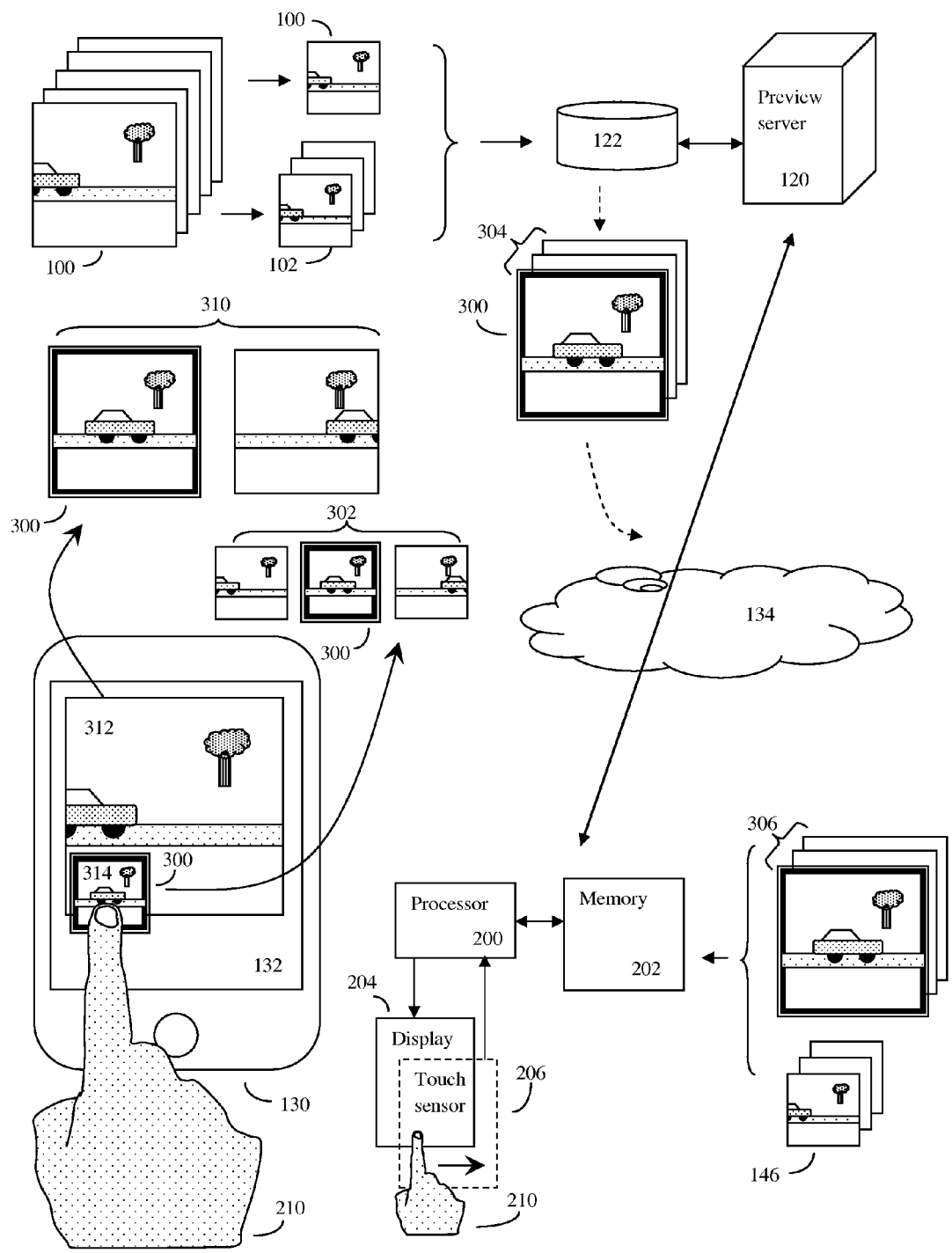
FIG. 3 shows how once finger movements have been used to select a region of a compressed preview video of interest, the location (i.e. place in time or frame count in the video) can be transmitted back to the preview server, and the preview server can in turn commence streaming or downloading of a higher quality version of the video, such as the original source video file or less compressed copy.

FIG. 3 shows how once finger movements (210) have been used to select a time region (300) on the playback (302) of a compressed preview video of interest (146), the location (i.e. place in time or frame count in the video) of this time of interest can be transmitted back to the preview internet server (120) by the network connection (134). The preview server can in turn use this time of interest data to commence streaming or download of a truncated version (304) of the higher quality source video file (100). This truncated version (304) of the source video file (or copy of the source video file that is of higher quality than the compressed preview video file 102) will often start at or around the selected time region of interest (300). A copy of this truncated version of the source video file (304) is thus downloaded or streamed by server (120) to the processor (200) and memory (202) of the client computerized device (130), producing a copy of the truncated version of the source video file (306). This in turn can play back from the memory (202) and processor (200) of the computerized device (130) and be displayed almost instantly in higher quality than the rather poor quality of the compressed preview video. As far as the user is concerned, the higher quality copy of the video (310) starts playing from the selected time region (300). In the meantime, the remaining portions of the higher quality source video can continue to be downloaded from server (120) in the background so that if the user decides to then jump back to an earlier portion of the video, higher quality video data will be already loaded in the memory (202) of the computerized device (130).

Put alternatively, in this embodiment, when the user touches (210) the video image or still image (312) displayed on the touch sensitive display screen (132), touch sensors (206) and application software residing in the memory (202) of the computerized device (130) detects this touch and directs the processor (200) to commence playing the preview video file (146), (314) on display screen (132) in a region that is often on or near the display screen location of the video image or still image (312). When the user swipes (i.e. touches with a sliding gesture) (210) either video image (312, 314), the application software detects this swiping motion and changes the rate of playing of the preview video file (146, 302, 314) on the display screen (132) according to the speed and/or direction of this swipe (210).

Further, when the user indicates by a full playback touch gesture (such as stopping the swipe and pressing down harder, or other gesture or command) that playback of the higher quality source video file (100) is now desired, the applications software transmits the time point or frame location (300) where the compressed preview video file playback (302) was at the time of this full playback gesture over the network (134) to the preview internet server (120).

The preview internet server (120) will then begin streaming or downloading the source digital video file (100) (or truncated version of the source digital video file) (304) to the client computerized device (130), often commencing at the same time point or corresponding frame location (300) on the source digital video file. The client computerized device (130) will then begin playing the copy of the source digital video file (306), (310) on the display (132) commencing from approximately the same part of the video (300) where the compressed preview video file (302), was playing when the full playback gesture was performed. This type of feature is occasionally referred to in this specification as "trickplay".

Note that due to the fact that the compressed preview video (302) has only some (e.g. often only 1 in 60) of the frames from the original source video, the application software and/or preview server software, for the highest viewing experience, may commence playback of the source video file at a time that is slightly offset from the original time point or corresponding frame location (300). This offset will usually be within about 1 second error or less from the originally selected time point, and may be chosen so as to incorporate considerations due to lossy source video compression schemes into account. For example, playback of the source video may commence at the nearest I-frame to the selected time point or frame location (300).

In another embodiment of the invention, the user may simultaneously select a plurality of compressed preview files for previewing. In this embodiment, shaking the computerized device (130) sends signals to the device's accelerometer (208), which in turn instructs the applications software to do a simultaneous playback and preview of all presently displayed compressed preview videos (146), (148). This is shown in FIG. 4.

Figure 4:
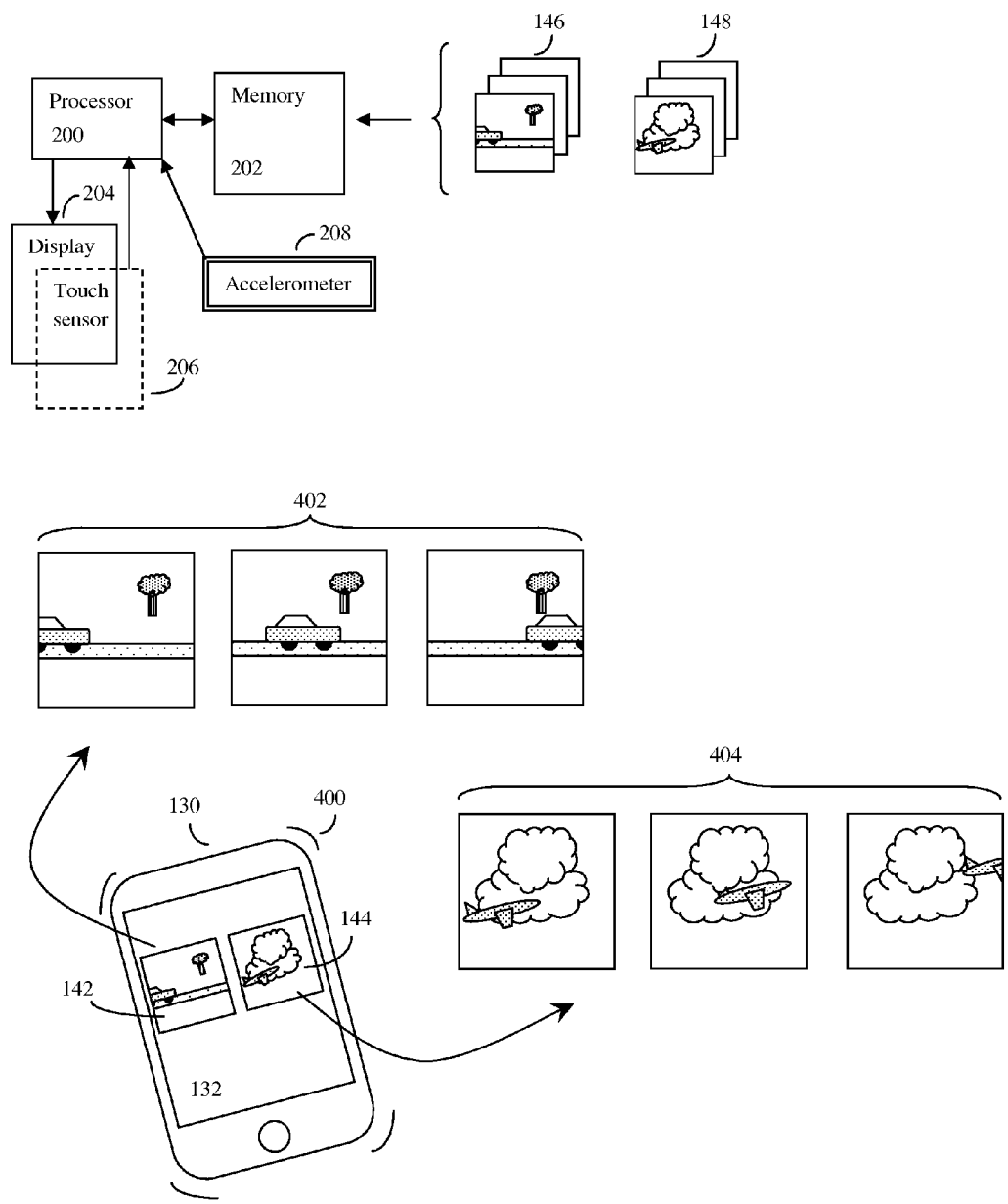
FIG. 4 shows an alternate method of simultaneously viewing a plurality of preview video files. Here shaking the computerized device sends signals to the device's accelerometer, which in turn triggers a simultaneous playback and preview of all presently displayed compressed preview videos.

As shown in FIG. 4, in this embodiment, the client computerized device (130) additionally comprises an accelerometer (208). Moving or shaking the client computerized device (130, 400) is detected by this accelerometer (208) as shaking input data. Application software residing in memory (202) may use this shaking input data as an instruction to commence simultaneous play of all compressed preview video files (146), (148) associated with the thumbnail video image files (142), (144) presently being shown on the display (132). This rapid video playback is shown as the video showing the car driving down the road (402) and the airplane flying through the clouds (404). Note that in this example, both are being played at the same time. In principle a large number of compressed video preview files may be simultaneously played back using this method.

Although in some embodiments, the source video files may be preloaded or otherwise initially found on the preview internet server (120) before the user wishes to request compressed preview video files, in other embodiments, the source video files may initially reside on an alternate server, such as a second internet server. This second internet server may be owned by a third party. An example of such a second internet server might be a site such as YouTube.com and the like. This embodiment is shown in FIG. 5.

Here, the plurality of source video files, exemplified by (100), (110) are stored on a database connected to a second internet server (500), and the client computerized device (130) is used to perform video file searches on this second internet server (500). Unlike the previous examples however, here either upon direct command from the client computerized device (502) or by command from the client computerized device (504) as relayed (506) by the preview server (120), the said second internet (500) server transmits the results of these video file searches to the preview internet server (120), and the preview internet server uses the results of this video file search to request the source digital video files (100), (110) from the second internet server (500). The preview internet server then generates the compressed preview video files (102, 112) and the thumbnail video image files (104, 114) and transmits them to the client computerized device (130) as before. The client computerized device (130) then displays the result of this second server (500) video search using compressed preview video files obtained from the preview internet server (120). The higher quality source video files may then be obtained by the client from either server, depending on how the application software and preview server software is configured.

Other Embodiments

In some embodiments, the invention's client application software may be implemented on the client computerized device (130) in the form of a software plug in for other third party software, such as a standard web browser. Using a web browser plug in as a specific example, the invention's application software plug in can thus work in the background while a user browses various third party internet video sites, determine if user interest in a particular set of videos is high enough for the application software plug-in to speculatively inform the preview internet server to speculatively request source video files from the third party site, and create and store compressed video files, and then feed these compressed video files to the application software plug in and hence to the user. The net effect would be to allow a user, while working within an otherwise standard web browser and viewing otherwise standard third party video sites, to enjoy the rapid preview benefits of the invention.

The invention claimed is:

1. An internet client-server method of allowing a user to rapidly preview a plurality of source video files, said method comprising:

obtaining a plurality of source video files, creating a plurality of compressed preview video files with less than half the resolution of said original video files, and thumbnail video image files from said source video files, and storing said, compressed preview video files, and thumbnail video image files on a preview internet server;

obtaining a client computerized device under control of said user, said client computerized device comprising at least one processor, memory, a touch sensitive display screen, a network connection to said internet server; and application software;

using said application software running on said client computerized device to request at least some of said plurality of thumbnail video image files from said preview internet server, and displaying thumbnail images produced from said thumbnail video image files on said touch sensitive display screen;

further using said preview internet server to transmit at least two of said plurality of compressed preview video files to said client computerized device, and storing at least some of said plurality of compressed video files in said client computerized device memory;

further creating video images from said source video files or compressed preview video files, transmitting said video images to said client computerized device, displaying said video images on said display, and additionally transmitting corresponding compressed preview video files corresponding to said video images to said client computerized device, and storing said compressed preview video files in said memory;

wherein source video files are also stored on said preview internet server;

wherein when said user touches said thumbnail image displayed on said touch sensitive display screen, said application software detects said touch and directs said processor to commence playing said compressed preview video file on said display screen;

wherein when said user swipes said thumbnail image or playing image of said compressed preview video file displayed on said touch sensitive display screen, said application software detects said swiping and changes the rate of playing of said preview video file on said display screen according to the speed and/or direction of said swipe;

wherein when said user touches said video image displayed on said touch sensitive display screen, said application software detects said touch and directs said processor to commence playing said preview video file on said display screen on or near the display screen location of the video image;

and when said user swipes said video image displayed on said touch sensitive display screen, said application software detects said swiping and changes the rate of playing of said preview video file on said display screen according to the speed and/or direction of said swipe;

and when said user indicates by a full playback touch gesture that playback of said source video file is desired at any given video time point of interest to said user, said application software transmits the time point or frame location where said compressed preview video file playback was at the time of said full playback gesture to said preview internet server; and said preview internet server begins streaming of said source digital video file to said client computerized device commencing at or near the same time point or corresponding frame location on said source digital video file; and said client computerized device starts playing said source digital video file on said display commencing from approximately the same part of the video where said compressed preview video file was playing when said full playback gesture was performed.

2. The method of claim 1, wherein said compressed preview video files are compressed at a source video image frame to preview video image frame ratio of 10 to 1 or greater.

3. The method of claim 1, wherein said application software running on said client computerized device is plugin software configured to convey preview functionality to other plugin capable software.

4. The method of claim 1, wherein said compressed preview files further compress the image resolution of said source video file thereby producing compressed preview video images with less than half the image resolution of said source video files.

5. The method of claim 1, wherein the transitions between successive image frames in either said source video files or said compressed preview video files are smoothed by a smoothing video transformation either before or during playback in order to make the compressed preview video more visually attractive.

6. The method of claim 5, wherein said smoothing video transformation is a dissolve video transformation.

7. The method of claim 1, wherein said thumbnail video image files are taken from or are derived from said compressed preview video files.

8. The method of claim 1, wherein said compressed preview video files associated with those thumbnail video image files currently being displayed on said client computerized device are automatically requested by at least one message from said application software to said preview internet server, and automatically transmitted from said preview internet server to said client computerized device.

9. The method of claim 1, wherein said compressed preview video file is automatically requested by said application software when said user touches said corresponding image of said thumbnail video image file, and said compressed preview video file is automatically transmitted from said preview internet server to said client computerized device.

10. The method of claim 9, wherein said compressed video preview file may commence playing before said compressed video preview file is fully transmitted by said preview internet server.

11. The method of claim 1, wherein said application software running on said client computerized device, or preview software running on said preview internet server either allow said user to select an algorithm or policy for downloading multiple compressed preview video files to said client computerized device; or wherein said application software or preview software running on said preview internet server monitor said user's pattern of viewing said compressed preview video files and source video files, and automatically select an algorithm or policy for downloading multiple compressed preview video files according to said pattern.

12. The method of claim 1, wherein said network connection to said internet server comprises at least one wireless link, and wherein said client computerized device is a mobile client computerized device.

13. The method of claim 12, wherein said mobile client computerized device is a Smartphone.

14. The method of claim 1, wherein said client computerized device additionally comprises an accelerometer, and wherein moving or shaking said client computerized device is detected by said accelerometer as shaking input data, and said application software uses said shaking input data as an instruction to commence simultaneous play of all compressed preview video files associated with thumbnail video image files presently being shown on said display.

15. The method of claim 1, wherein said plurality of source video files are stored on a second internet server, and said client computerized device is used to perform video file searches on said second internet server;

wherein said second internet server transmits the results of said video file searches to said preview internet server;

said preview internet server uses the results of said video file search to request said source digital video files from said second internet server, and said preview internet server then produces corresponding compressed preview video files;

and said client computerized device displays the result of said search using compressed preview video files obtained from said preview internet server.

16. An internet client-server method of allowing a user to rapidly preview a plurality of source video files, said method comprising:

obtaining a plurality of source video files, creating a plurality of compressed preview video files and thumbnail video image files from said source video files, and storing said plurality of source video files, compressed preview video files, and thumbnail video image files on a preview internet server;

wherein said compressed preview video files are compressed at a source video image frame to preview video image frame ratio of 10 to 1 or greater;

wherein said compressed preview files further compress the image resolution of said source video file thereby producing a compressed preview video image with less than half the image resolution of said source video files;

wherein the transitions between successive image frames in either said source video files or said compressed preview video files are smoothed by a smoothing video transformation in order to make the compressed preview video more visually attractive;

obtaining a client computerized device under control of said user, said client computerized device comprising at least one processor, memory, a touch sensitive display screen, a network connection to said internet server; and application software;

wherein said network connection to said internet server comprises at least one wireless link, and wherein said client computerized device is a mobile client computerized device;

wherein said client computerized device additionally comprises an accelerometer, and wherein moving or shaking said client computerized device is detected by said accelerometer as shaking input data, and said application software uses said shaking input data as an instruction to commence simultaneous play of all compressed preview video files associated with thumbnail video image files presently being shown on said display;

using said application software running on said client computerized device to request at least two of said plurality of thumbnail video image files from said preview internet server, and displaying images produced from said thumbnail video image files on said touch sensitive display screen;

further using said preview internet server to transmit at least two of said plurality of compressed preview video files to said client computerized device, and storing at least some of said plurality of compressed video files in said client computerized device memory;

further creating video images from said source video files or compressed preview video files, transmitting said video images to said client computerized device, displaying said video images on said display, and additionally transmitting corresponding compressed preview video files corresponding to said video images to said client computerized device, and storing said compressed preview video files in said memory;

wherein source video files are also stored on said preview internet server;

wherein when said user touches said thumbnail image displayed on said touch sensitive display screen, said application software detects said touch and directs said processor to commence playing said preview video file on said display screen;

wherein when said user swipes said thumbnail image displayed on said touch sensitive display screen, said application software detects said swiping and changes the rate of playing of said preview video file on said display screen according to the speed and/or direction of said swipe;

wherein when said user touches said video image displayed on said touch sensitive display screen, said application software detects said touch and directs said processor to commence playing said preview video file on said display screen on or near the display screen location of the video image;

and when said user swipes said video image displayed on said touch sensitive display screen, said application software detects said swiping and changes the rate of playing of said preview video file on said display screen according to the speed and/or direction of said swipe;

and when said user indicates by a full playback touch gesture that playback of said source video file is desired at any given video time point of interest to said user, said application software transmits the time point or frame location where said compressed preview video file playback was at the time of said full playback gesture to said preview internet server; and said preview internet server begins streaming of said source digital video file to said client computerized device commencing at or near the same time point or corresponding frame location on said source digital video file; and said client computerized device starts playing said source digital video file on said display commencing from approximately the same part of the video where said compressed preview video file was playing when said full playback gesture was performed.

17. The method of claim 16, wherein said application software or software running on said preview internet server either allow said user to select an algorithm or policy for downloading multiple compressed preview video files to said client computerized device, or wherein said application software or software running on said preview internet server monitor said user's pattern of viewing said compressed preview video files and source video files and automatically select an algorithm or policy for downloading multiple compressed preview video files according to said pattern.

18. The method of claim 16, wherein said plurality of source video files are initially stored on a second internet server, and said client computerized device is used to perform video file searches on said second internet server;

wherein said second internet server transmits the results of said video file searches to said preview internet server;

said preview internet server uses the results of said video file search to request said source digital video files from said second internet server, and said preview internet server then produces corresponding compressed preview video files;

and said client computerized device displays the result of said search using compressed preview video files obtained from said preview internet server.

19. The method of claim 16, further creating video images from said source video files, transmitting said video images to said client computerized device, displaying said video images on said display, additionally transmitting corresponding compressed preview video files corresponding to said video images to said client computerized device, and storing said compressed preview video files in said memory;

Wherein when said user touches said video image displayed on said touch sensitive display screen, said application software detects said touch and directs said processor to commence playing said preview video file on said display screen on or near the display screen location of the video image;

and when said user swipes said video image displayed on said touch sensitive display screen, said application software detects said swiping and changes the rate of playing of said preview video file on said display screen according to the speed and/or direction of said swipe;

and when said user indicates by a full playback touch gesture that playback of said source video file is desired at any given video time point of interest to said user, said applications software transmits the time point or frame location where said compressed preview video file playback was at the time of said full playback gesture to said preview internet server;

said preview internet server begins streaming of said source digital video file to said client computerized device commencing at the same time point or corresponding frame location on said source digital video file; and said client computerized device starts playing said source digital video file on said display commencing from approximately the same part of the video where said compressed preview video file was playing when said full playback gesture was performed.

\* \* \* \* \*